United States Patent
Chen et al.

(10) Patent No.: US 9,954,583 B2
(45) Date of Patent: Apr. 24, 2018

(54) MOBILE TERMINAL AND NEAR FIELD COMMUNICATION ANTENNA

(71) Applicant: BYD COMPANY LIMITED, Shenzhen (CN)

(72) Inventors: Yajuan Chen, Shenzhen (CN); Jiangang Zhou, Shenzhen (CN); Dajun Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/126,195

(22) PCT Filed: Nov. 25, 2014

(86) PCT No.: PCT/CN2014/092200
§ 371 (c)(1),
(2) Date: Sep. 14, 2016

(87) PCT Pub. No.: WO2015/143884
PCT Pub. Date: Oct. 1, 2015

(65) Prior Publication Data
US 2017/0085301 A1    Mar. 23, 2017

(30) Foreign Application Priority Data
Mar. 28, 2014   (CN) .......................... 2014 1 0123232

(51) Int. Cl.
*H04B 5/00*   (2006.01)
*H01Q 7/00*   (2006.01)
(Continued)

(52) U.S. Cl.
CPC ........... *H04B 5/0081* (2013.01); *H01Q 1/243* (2013.01); *H01Q 7/00* (2013.01); *H04W 4/008* (2013.01)

(58) Field of Classification Search
CPC ........ H04B 5/0081; H01Q 1/243; H01Q 7/00; H04W 4/008
(Continued)

(56) References Cited

U.S. PATENT DOCUMENTS

2009/0206473 A1   8/2009  Lopez et al.
2010/0321253 A1  12/2010  Ayala Vazquez et al.
(Continued)

FOREIGN PATENT DOCUMENTS

CN        2850006 Y    12/2006
CN        1937423 A     3/2007
(Continued)

OTHER PUBLICATIONS

International Search Report and Written Opinion for International Application No. PCT/CN2014/092200 dated Feb. 17, 2015, with English translation of Search Report, 10 pages.
(Continued)

*Primary Examiner* — Eugene Yun
(74) *Attorney, Agent, or Firm* — Alston & Bird LLP

(57) ABSTRACT

A mobile terminal and a NFC antenna are provided. The mobile terminal includes: a terminal body, including a rear surface defined with a rear longitudinal centerline and a rear transverse centerline; near field communication antenna, disposed on the rear surface of the terminal body; wherein at least one of the rear longitudinal centerline and the rear transverse centerline pass through the near field communication antenna, and the near field communication antenna is disposed asymmetrically to the at least one of the rear longitudinal centerline and the rear transverse centerline. The mobile terminal according to the present disclosure shows a lower deviation of the resonance frequency when operating the P2P networking, and also shows high com-
(Continued)

munication sensitivity, a high communication success rate, a strong communication capability, etc.

13 Claims, 12 Drawing Sheets

(51) Int. Cl.
*H01Q 1/24* (2006.01)
*H04W 4/00* (2018.01)
(58) Field of Classification Search
USPC .......................................................... 455/41.1
See application file for complete search history.

(56) References Cited

U.S. PATENT DOCUMENTS

| | | |
|---|---|---|
| 2012/0001814 A1 | 1/2012 | Copeland et al. |
| 2013/0147670 A1 | 6/2013 | Nakano et al. |
| 2013/0176094 A1 | 7/2013 | Hong et al. |
| 2013/0229319 A1 | 9/2013 | Miura et al. |
| 2014/0002313 A1 | 1/2014 | Yang et al. |
| 2014/0009348 A1* | 1/2014 | Behin ..................... H01Q 7/00 343/726 |
| 2014/0078017 A1 | 3/2014 | Vanjani et al. |
| 2014/0163338 A1 | 6/2014 | Roesicke |
| 2014/0191916 A1 | 7/2014 | Hiromitsu |
| 2014/0291404 A1 | 10/2014 | Matsuoka et al. |
| 2014/0361931 A1 | 12/2014 | Irci et al. |
| 2015/0241935 A1 | 8/2015 | Jang et al. |
| 2015/0303576 A1 | 10/2015 | Latrach et al. |

FOREIGN PATENT DOCUMENTS

| | | |
|---|---|---|
| CN | 201557253 U | 8/2010 |
| CN | 101833687 A | 9/2010 |
| CN | 201590480 U | 9/2010 |
| CN | 201663226 U | 12/2010 |
| CN | 201663766 U | 12/2010 |
| CN | 201673524 U | 12/2010 |
| CN | 201781051 U | 3/2011 |
| CN | 102075221 A | 5/2011 |
| CN | 201821338 U | 5/2011 |
| CN | 201830251 A | 5/2011 |
| CN | 201838018 U | 5/2011 |
| CN | 201927700 U | 8/2011 |
| CN | 202353618 U | 7/2012 |
| CN | 102714523 A | 10/2012 |
| CN | 202487773 U | 10/2012 |
| CN | 102790263 A | 11/2012 |
| CN | 202641415 U | 1/2013 |
| CN | 103247853 A | 8/2013 |
| CN | 203149461 U | 8/2013 |
| CN | 203149462 U | 8/2013 |
| CN | 203150693 U | 8/2013 |
| CN | 103310705 A | 9/2013 |
| CN | 203276723 U | 11/2013 |
| CN | 203351736 U | 12/2013 |
| CN | 203351748 U | 12/2013 |
| CN | 103515704 A | 1/2014 |
| CN | 103618131 A | 3/2014 |
| CN | 203482547 U | 3/2014 |
| GB | 2 471 753 A | 1/2011 |
| JP | 2000-137777 | 5/2000 |
| JP | 2001-007629 | 1/2001 |
| JP | 2003-069336 | 3/2003 |
| JP | 2004-153463 | 5/2004 |
| JP | 2005-284511 | 10/2005 |
| JP | 2006-270448 | 10/2006 |
| JP | 2007-306287 | 11/2007 |
| JP | 2009-064454 | 3/2009 |
| JP | 2011-115531 A | 6/2011 |
| JP | 2011-193349 A | 9/2011 |
| JP | 2012-105365 | 5/2012 |
| KR | 20140031358 | 3/2014 |
| WO | WO 2012/013054 A1 | 2/2012 |
| WO | WO 2013/011709 A1 | 1/2013 |
| WO | WO 2013/051684 A1 | 4/2013 |
| WO | WO 2014/169508 A1 | 10/2014 |

OTHER PUBLICATIONS

Extended European Search Report from corresponding European Patent Application No. 14818250.4 dated Jan. 20, 2017.
Extended European Search Report from corresponding European Patent Application No. 14887036.3 dated Oct. 5, 2017, 9 pages.
International Search Report and Written Opinion for International Application No. PCT/CN2014/080667, dated Oct. 14, 2014, 10 pages.
Office Action for U.S. Appl. No. 14/891,263 dated Apr. 20, 2017, 14 pages.
Office Action for U.S. Appl. No. 14/891,263 dated Aug. 15, 2017, 19 pages.
Office Action for U.S. Appl. No. 14/891,263 dated Jul. 5, 2016, 14 pages.
Office Action for U.S. Appl. No. 14/891,263 dated Nov. 4, 2016, 13 pages.
Office Action from European Patent Application No. 14818250.4 dated Feb. 5, 2018, 7 pages.
Office Action for Japanese Application No. 2016-559582 dated Oct. 13, 2017 with English Translation, 14 pages.

* cited by examiner

MOBILE TERMINAL AND NEAR FIELD COMMUNICATION ANTENNA

CROSS REFERENCE TO RELATED APPLICATIONS

This application claims the benefit of International Patent Application No. PCT/CN2014/092200, filed Nov. 25, 2014, which claims the benefit of Chinese Patent Application No. 201410123232.6, filed Mar. 28, 2014, each of which is incorporated by reference herein in its entirety.

FIELD

The present disclosure relates to the communication field, and more particularly to a mobile terminal and a near field communication antenna.

BACKGROUND

A near field communication (NFC) antenna consists of a circuit board and a planar coil. When two mobile terminals each including an NFC antenna operate a peer-to-peer (P2P) networking, the two NFC antennas may interfere with each other, which may cause a large deviation of a resonance frequency, affect a communication sensitivity and success rate, and thus there is a need for improvements.

SUMMARY

The present disclosure is provided by the inventor, based on discoveries of the following facts and problems by the inventor.

Through a plurality of experiments and analysis of test results, the inventor has found that, interaction between two NFC antennas may decrease with decreasing of a corresponding overlapping area of the two NFC antennas opposed to each other. At the beginning of the decreasing of the corresponding overlapping area of the two NFC antennas opposed to each other, a decrease of the deviation of the resonance frequency is obvious; when the corresponding overlapping area of the two NFC antennas opposed to each other increases, the decrease of the deviation of the resonance frequency trends gently. While the two NFC antennas are staggered to each other completely, the resonance frequency trends stable. In the related art, the NFC antenna is of a symmetric structure, thus two NFC antennas may exactly overlap with each other when two mobile terminals are disposed back to back, thus when these two mobile terminals operate the peer-to-peer networking, a large mutual interference between the two NFC antennas may cause a decrease to the communication sensitivity.

Therefore, the present disclosure provides a mobile terminal. The mobile terminal shows a smaller deviation of the resonance frequency when operating the peer-to-peer networking, and also shows high communication sensitivity, a high communication success rate, a strong communication capability, etc.

The mobile terminal according to embodiments of the present disclosure includes: a terminal body, including a rear surface defined with a rear longitudinal centerline and a rear transverse centerline; and a near field communication antenna, disposed on the rear surface of the terminal body. At least one of the rear longitudinal centerline and the rear transverse centerline pass through the near field communication antenna, and the near field communication antenna is disposed asymmetrically to the at least one of the rear longitudinal centerline and the rear transverse centerline.

With the mobile terminal according to embodiments of the present disclosure, the NFC antenna is disposed asymmetrically to the at least one of the rear longitudinal centerline and the rear transverse centerline of the terminal body, and at least one of the rear longitudinal centerline and the rear transverse centerline pass through the NFC antenna, thus when two mobile terminals are disposed back to back to operate the peer-to-peer networking, one of the two NFC antennas may have a first part thereof opposed to the other, and a second part thereof staggered from the other. Therefore, the first part of the two NFC antennas may ensure transmitting and receiving of signals, the second part of the two NFC antennas may decrease the interference between the two NFC antennas and the deviation of the resonance frequency, which may ensure an operating frequency of the NFC antenna within a bandwidth range, and further ensure the communication sensitivity and success rate.

Thus, the mobile terminal according to embodiments of the present disclosure shows a lower deviation of the resonance frequency when operating P2P networking, and also shows high communication sensitivity, a high communication success rate, a strong communication capability, etc.

In some embodiments, the near field communication (NFC) antenna includes: a circuit substrate; and a coil, disposed on the circuit substrate, wherein the at least one of the rear longitudinal centerline and the rear transverse centerline pass through the coil, and the coil is disposed asymmetrically to the at least one of the rear longitudinal centerline and the rear transverse centerline.

In some embodiments, the coil is of a quadrilateral ring structure defined with a coil longitudinal centerline, and the coil longitudinal centerline is deviated from the rear longitudinal centerline.

In some embodiments, a ratio of a distance between the coil longitudinal centerline and the rear longitudinal centerline to a ring width of the coil is ½.

In some embodiments, the coil is of a quadrilateral ring structure defined with a coil transverse centerline, and the coil transverse centerline is deviated from the rear transverse centerline.

In some embodiments, a ratio of a distance between the coil transverse centerline and the rear transverse centerline to a ring width of the coil is ½.

In some embodiments, the coil is of a quadrilateral ring structure, a triangular ring structure or a circular structure.

In some embodiments, the coil is of a quadrilateral ring structure and has a recess adjacent to a corner thereof.

In some embodiments, the recess is of a rectangular structure, and a width of the recess is equal to a ring width of the coil.

In some embodiments, the recess evades an ending of a wire which is wound into the coil.

In some embodiments, two recesses are provided, and the two recesses are disposed adjacent to two opposed corners of the coil respectively.

In some embodiments, the circuit substrate is defined with a substrate longitudinal centerline superposed to the rear longitudinal centerline.

In some embodiments, the circuit substrate is defined with a substrate transverse centerline superposed to the rear transverse centerline.

The present disclosure further provides a near field communication (NFC) antenna. The near field communication (NFC) antenna includes: a circuit substrate, defined with a substrate longitudinal centerline and a substrate transverse centerline; and a coil, disposed on the circuit substrate, wherein at least one of the substrate longitudinal centerline and the substrate transverse centerline pass through the coil, and the coil is disposed asymmetrically to the at least one of the substrate longitudinal centerline and the substrate transverse centerline.

The NFC antenna according to embodiments of the present disclosure, is provided by means of the coil being disposed asymmetrically to the at least one of the substrate longitudinal centerline and the substrate transverse centerline, and the at least one of the substrate longitudinal centerline and the substrate transverse centerline passing through the coil. Thus when two NFC antennas operate the peer-to-peer networking, one coil of the two NFC antennas may have a third part thereof opposed to the other coil, and a fourth part thereof staggered from the other coil. Therefore, the third part of the coil of the two NFC antennas may ensure transmitting and receiving of signals, the fourth part of the coil of the two NFC antennas may decrease the interference between the two NFC antennas and the deviation of the resonance frequency, which may ensure the operating frequency of the NFC antenna within the bandwidth range, further ensure the communication sensitivity and success rate.

Thus, the NFC antenna according to embodiments of the present disclosure shows a lower deviation of the resonance frequency when operating P2P networking, and also shows high communication sensitivity, a high communication success rate, a strong communication capability, etc.

Figure 1:
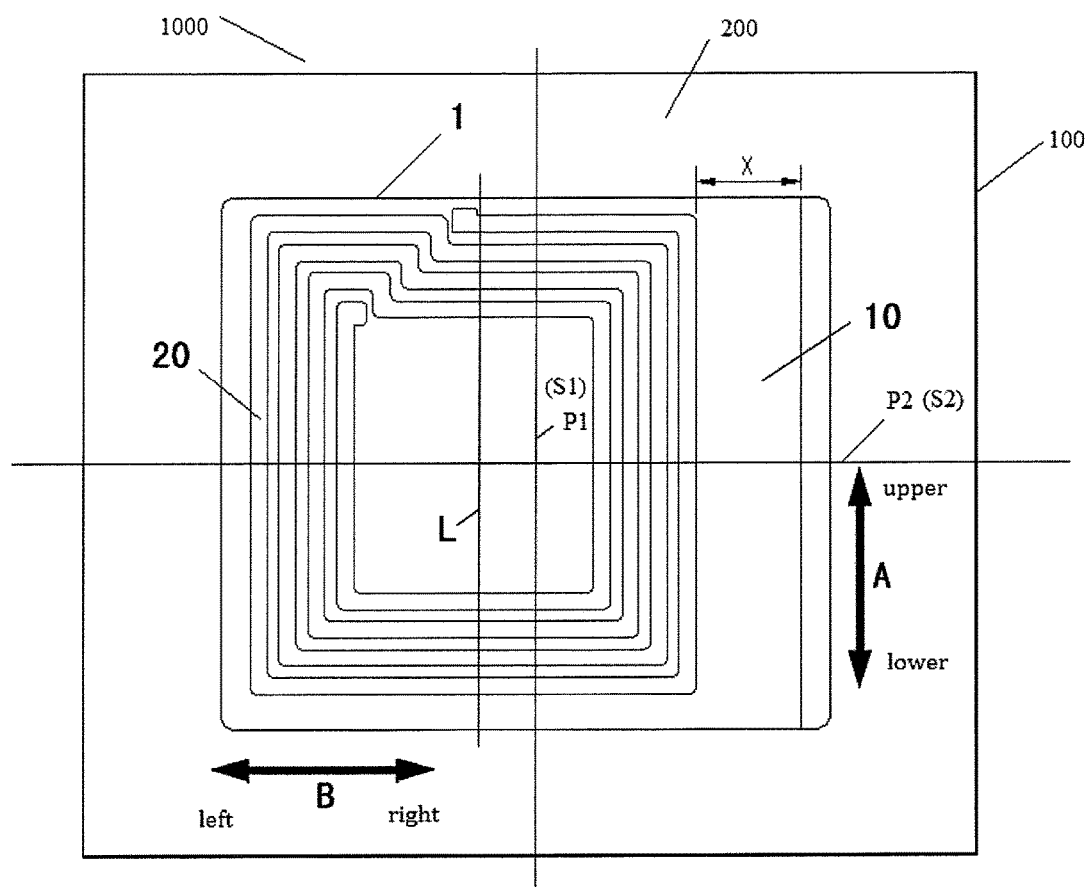
FIG. 1 is a schematic view of a mobile terminal having a NFC antenna according to embodiments of the present disclosure.

REFERENCE NUMERALS mobile terminal 1000, terminal body 100, rear surface 200 of the terminal body, rear longitudinal centerline P1 of the terminal body, rear transverse centerline P2 of the terminal body;

NFC antenna 1, circuit substrate 10, substrate longitudinal centerline S1, substrate transverse centerline S2;

coil 20 of first NFC antenna, coil longitudinal centerline L of coil 20, recess 21, ending of wire 22;

coil 20' of second NFC antenna.

DETAILED DESCRIPTION

Reference will be made in detail to embodiments of the present disclosure. The embodiments are described herein with reference to drawings. The same or similar elements and the elements having same or similar functions are denoted by like reference numerals throughout the descriptions. The embodiments described with reference to drawings are explanatory, illustrative, and used to generally understand the present disclosure. The embodiments shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The inventor of the present disclosure finds that, when two mobile terminals each including a NFC antenna operate P2P networking, the size of the corresponding overlapping area of the two NFC antennas opposed to each other has a significant impact on the communication sensitivity and success rate. The interaction between two NFC antennas decreases with the decreasing of the corresponding overlapping area of the two NFC antennas opposed to each other. When the NFC antenna is of a symmetric structure, the two NFC antennas may exactly overlap with each other when two mobile terminals are disposed back to back, and thus a large interaction between the two NFC antennas occurs that may cause a decrease to communication sensitivity.

A mobile terminal according to embodiments of the present disclosure will be described below referring to FIGS. 1 to 12.

As shown in FIG. 1, the mobile terminal 1000 according to embodiments of the present disclosure includes a terminal body 100 and a NFC antenna 1.

In particular, the terminal body 100 includes a rear surface 200. The rear surface 200 is defined with a rear longitudinal centerline P1 and a rear transverse centerline P2. The NFC antenna 1 is disposed on the rear surface 200 of the terminal body. The rear longitudinal centerline P1 of the terminal body passes through the NFC antenna, i.e. a projection of the NFC antenna 1 projected on the rear surface 200 of the terminal body is crossing over the rear longitudinal centerline P1 of the terminal body 100. The portions of the NFC antenna 1 disposed on both sides of the rear longitudinal centerline P1 of the terminal body 100 are asymmetric. In other words, a first portion of the NFC antenna 1 is disposed on a left side of the rear longitudinal centerline P1 of the terminal body 100, and a second portion of the NFC antenna 1 is disposed on a right side of the rear longitudinal centerline P1 of the terminal body 100, a left-right direction is represented by arrow B in FIGS. 1 to 12, and the first portion of the NFC antenna 1 disposed on the left side of the rear longitudinal centerline P1 of the terminal body 100 and the second portion of the NFC antenna 1 disposed on the right side of the rear longitudinal centerline P1 of the terminal body 100 is asymmetric with respect to the rear longitudinal centerline P1 of the terminal body 100, i.e. the NFC antenna 1 is asymmetrically disposed with respect to the rear longitudinal centerline P1 of the terminal body 100. In some embodiments, the rear longitudinal centerline P1 of the terminal body 100 refers to an imaginary line oriented in an upper-lower direction and disposed at the center of the rear surface 200 of the terminal body 100 in the left-right direction, and the upper-lower direction is represented by arrow A in FIGS. 1 to 12.

It is to be understood that, according to the mobile terminal 1000 of embodiments of the present disclosure, the rear transverse centerline P2 of the terminal body 100 may also pass through the NFC antenna 1, and the NFC antenna 1 is asymmetrically disposed with respect to the rear transverse centerline P2 of the terminal body 100. Thereby, two mobile terminals 1000 may be disposed back to back when operating P2P networking. In some embodiments, the rear transverse centerline P2 of the terminal body 100 refers to an imaginary line oriented in the left-right direction and disposed at the center of the rear surface of the terminal body in the upper-lower direction, and the left-right direction is represented by arrow B in FIGS. 1 to 12.

The NFC antenna 1 may also pass through both the rear longitudinal centerline P1 and the rear transverse centerline P2 of the terminal body 100, and the NFC antenna 1 is asymmetrically disposed with respect to both the rear longitudinal centerline P1 and the rear transverse centerline P2 of the terminal body 100, thus to achieve the purpose of the present disclosure.

The mobile terminal 1000 according to embodiments of the present disclosure, is provided by means of the NFC antenna 1 being disposed asymmetrically to the at least one of the rear longitudinal centerline P1 and the rear transverse centerline P2 of the terminal body 100, and at least one of the rear longitudinal centerline P1 and the rear transverse centerline P2 passing through the NFC antenna 1. Thus when two mobile terminals are disposed back to back to operate P2P networking, one of the two NFC antennas 1 may have the first part thereof opposed to the other, and the second part thereof staggered from the other. Therefore, the first part of the two NFC antennas 1 may ensure transmitting and receiving of signals, the second part of the two NFC antennas 1 may decrease the interference between the two NFC antennas 1 and the deviation of the resonance frequency, which may ensure an operating frequency of the NFC antenna 1 within a bandwidth range, and further improve communication sensitivity and success rate.

Thus, the mobile terminal according to embodiments of the present disclosure shows a lower deviation of the resonance frequency when operating P2P networking, and also shows high communication sensitivity, a high communication success rate, a strong communication capability, etc.

Specifically, in one embodiment, the mobile terminal 1000 is mobile phone.

The mobile terminal 1000 according to specific embodiments of the present disclosure will be described below by way of an example that the NFC antenna 1 is asymmetrically disposed with respect to the rear longitudinal centerline P1 of the terminal body 100.

In some embodiments of the present disclosure, as shown in FIGS. 1 to 12, the NFC antenna 1 includes a circuit substrate 10 and a coil 20. The circuit substrate 10 is known to one skilled in the related art, which is made of an insulating material. The coil 20 is disposed on the circuit substrate 10, the rear longitudinal centerline P1 of the terminal body pass through the coil 20, and both portions of the coil 20 disposed on both sides of the rear longitudinal centerline P1 are asymmetric. In other words, the circuit substrate 10 may be symmetric with respect to the rear longitudinal centerline P1 of the terminal body 100, or may be asymmetric with respect to the rear longitudinal centerline P1 of the terminal body 100, as long as the coil 20 is symmetric with respect to the rear longitudinal centerline P1 of the terminal body 100.

It's to be understood that, the coil 20 may be of a quadrilateral ring structure, a triangular ring structure, a circular structure or any other structure. For ease of description, the NFC antenna 1 according to the present disclosure will be described by an example that the coil 20 is of a quadrilateral ring structure.

Figure 2:
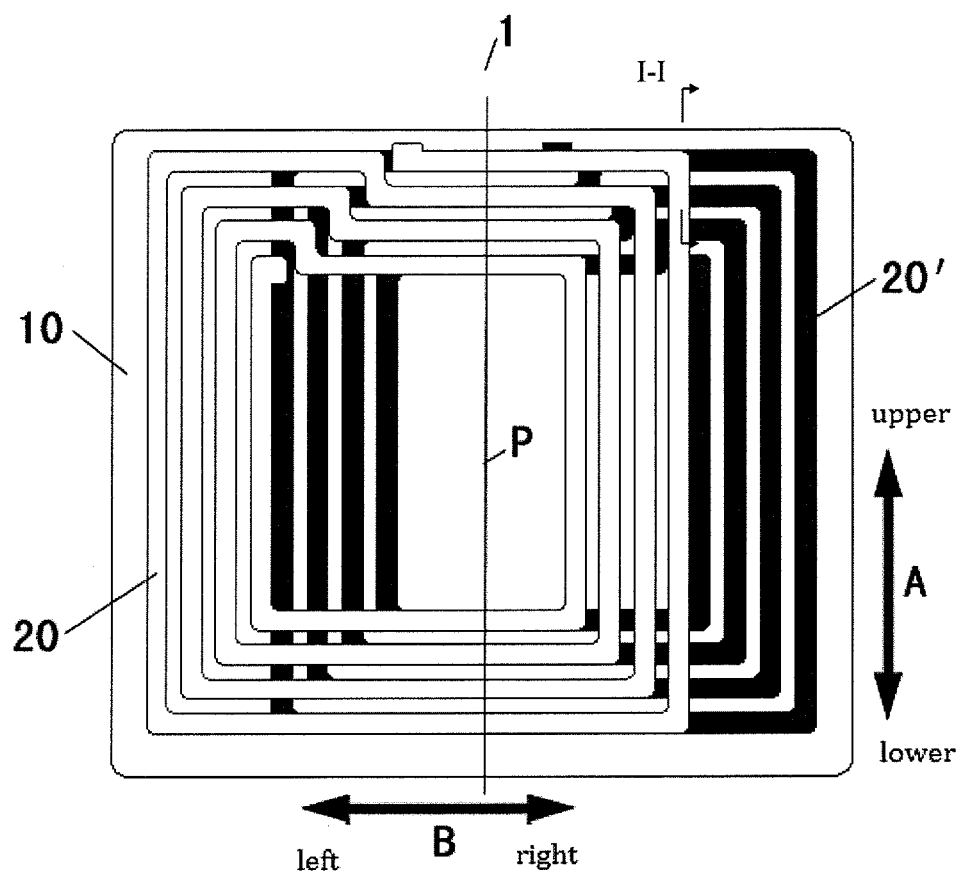
FIG. 2 is a schematic view showing two NFC antennas as shown in FIG. 1 opposed to each other when operating the P2P networking.

In some embodiments of the present disclosure, as shown in FIGS. 1 and 2, the coil 20 may be symmetric with respect to a coil longitudinal centerline L thereof, and the coil longitudinal centerline L deviates from the rear longitudinal centerline P1 of the terminal body 100. When two mobile terminals 1000 operate P2P networking, a coil 20 of a first NFC antenna 1 may have the first part opposed to a coil 20' of a second NFC antenna 1, and the second part staggered from the coil 20' of the second NFC antenna 1. Thereby, with the near field wireless communication being achieved, the mutual interference between two NFC antennas 1 is also decreased.

A larger symmetrical area of the NFC antenna 1 results in a stronger capacity of receiving signals and a smaller symmetrical area of the NFC antenna 1 results in less deviation of the resonance frequency. Thus, to balance both of above mentioned, a percentage of an asymmetrical portion of NFC antenna 1 may be limited.

As shown in FIG. 1, a ratio of a distance between the coil longitudinal centerline L and the rear longitudinal centerline P1 of the terminal body 100 to a ring width of the coil 20 is ½. In one embodiment, the ring width of the coil 20 refers to a value=(width of each turn of wires*number of turns)+ [distance between adjacent two turns of wires*(number of turns−1)]. In other words, if the NFC antenna 1 was folded along the rear longitudinal centerline P1 of the terminal body 100, a distance between a left edge and a right edge of the coil 20 is equal to the ring width of the coil. As shown in FIG. 1, a distance represented by X is equal to the ring width of the coil 20.

Thus, an effective working area of the NFC antenna 1 may be optimized to increase the capability of transmitting and receiving magnetic energy, and the mutual interference of the NFC antenna 1 when operating P2P networking may be also decreased to further decrease the deviation of the resonance frequency and ensure the operating frequency within the bandwidth range. While the communication success rate is optimized, the wireless communication of the NFC antenna 1 can be achieved at a maximum distance range.

In one embodiment of the present disclosure, as shown in FIG. 1, the NFC antenna 1 has a size of 50*40 mm, the ring width of coil 20 of the NFC antenna 1 is 8 mm. When the value of X is 0, the working mode of two mobile terminals is set into the P2P communication mode, and the two mobile terminals are placed back to back until being completely overlapped by a conventional operating manner, if the communication between the two mobile terminals is completed, success is recorded; if the communication between the two mobile terminals is uncompleted, failure is recorded. After 10 iterations of the test, a statistic is determined such as the communication success rate being 30%. Then the two mobile terminals are pulled apart from each other to increase the relative distance, and a maximum distance for communication between the two mobile terminals of 30 mm is obtained from the test. While the value of X is increasing from 0, the deviation of the resonance frequency is decreasing, and the distance for communication is also decreasing. When the value of X increases until 8±3 mm, the working mode of two mobile terminals is set into the P2P communication mode, and the two mobile terminals are placed back to back until being completely overlapped by a conventional operating manner. After 10 times of above test, a statistic showing that the communication success rate is 100% is obtained. Then the two mobile terminals are pulled apart from each other to increase the relative distance, it is obtained from the test that the maximum distance for communication between the two mobile terminals is 25 mm. Thus, an optimum designed value of X is 8±3 mm.

In some other embodiments of the present disclosure, as shown in FIGS. 3 to 12, the coil longitudinal centerline L may be overlapped with the rear longitudinal centerline P1 of the terminal body 100, and the coil 20 may be asymmetric with respect to the coil longitudinal centerline L thereof.

Figure 3:
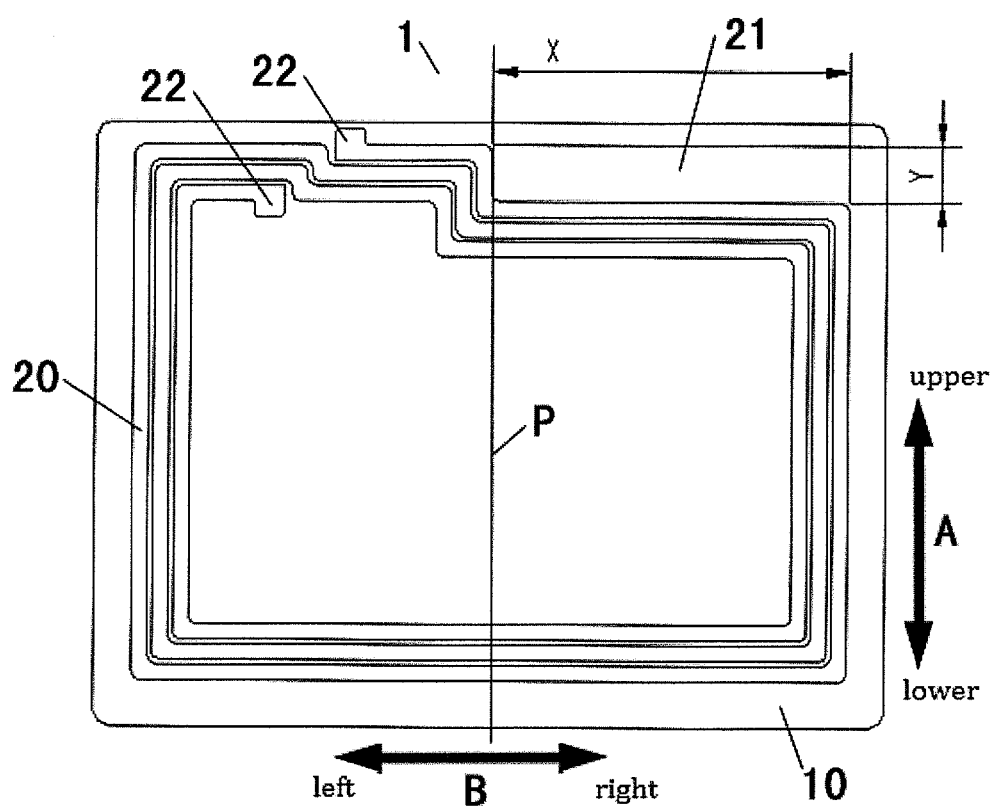
FIG. 3 is schematic view of a NFC antenna of a mobile terminal according to a first embodiment of the present disclosure.
Figure 4:
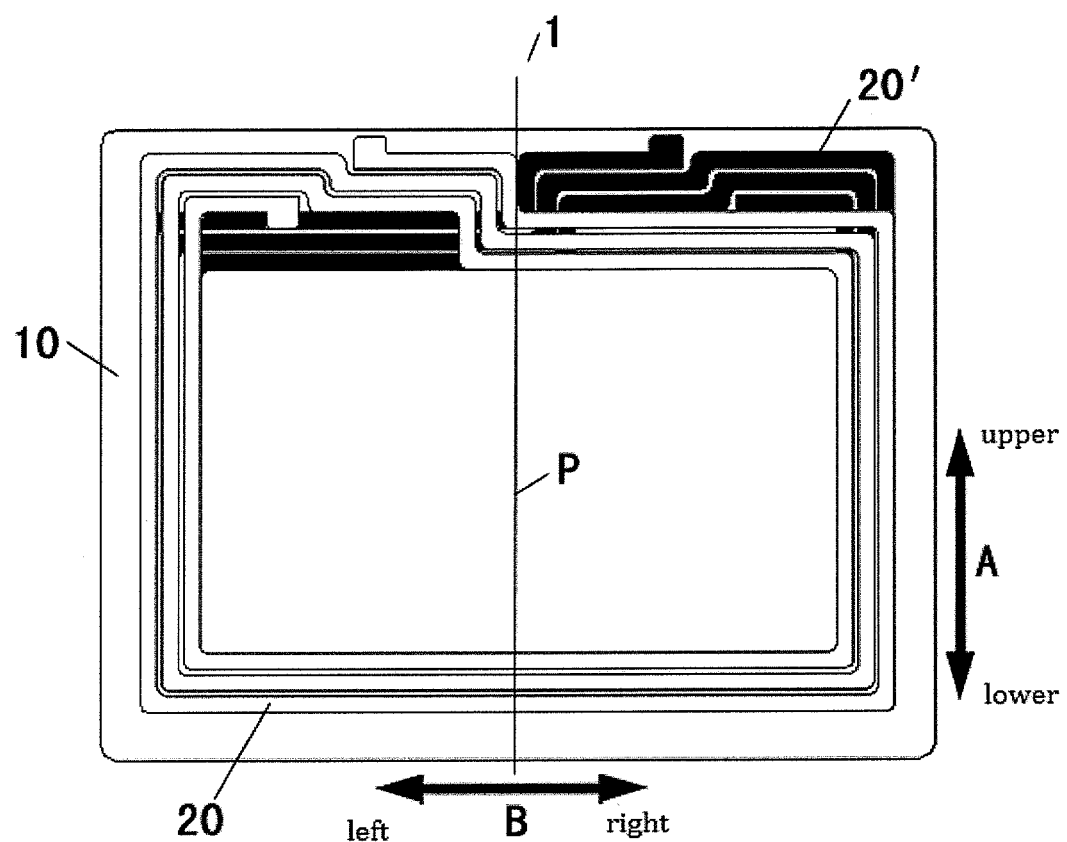
FIG. 4 is a schematic view showing two NFC antennas as shown in FIG. 3 opposed to each other when operating P2P networking.

As shown in FIGS. 3 and 4, the coil 20 has a recess 21 disposed on an upper right portion of the coil 20, dented towards the center of the coil 20, and adjacent to an upper right corner of the coil 20. The recess 21 is of a rectangular structure orientated in the left-right direction. The rectangular recess 21 has a long side parallel to an upper edge of the coil 20 and a short side parallel to the right edge of the coil 20.

In other words, as shown in FIG. 3, the upper edge of the coil 20 is provided with a bending portion bending downwards in a direction extending from left to right. The bending portion is adjoined to the rear longitudinal centerline P1 of the terminal body, and disposed before the rear longitudinal centerline P1 of the terminal body 100.

To facilitate the formation of the recessed 21, the recess 21 may evade an ending of a wire which is wound into the coil.

Advantageously, a width of the recess 21 is equal to the ring width of the coil 20. In other words, a width of the recess 21 in the upper-lower direction, referring to a distance represented by Y as shown in FIG. 3, is equal to the ring width of the coil 20. A length of the recess 21, referring to a distance represented by X as shown in FIG. 3, is equal to a half of a length of the coil 20 in the left-right direction. Thus, while the communication success rate is maximally improved, the wireless communication of the NFC antenna 1 can be achieved at a maximum distance range.

In one embodiment of the present disclosure, as shown in FIG. 3, by an example that the NFC antenna 1 has a size of 50*40 mm, the ring width of coil 20 of the NFC antenna 1 is 4 mm. When the value of X is 0, the working mode of two mobile terminals is set into the P2P communication mode, and the two mobile terminals are placed back to back until being completely overlapped by a conventional operating manner, if the communication between the two mobile terminals is completed, success is recorded; if the communication between the two mobile terminals is uncompleted, failure is recorded. After 10 iterations of above test, a statistic is obtained showing that the communication success rate is 30%. Then the two mobile terminals are pulled apart from each other to increase the relative distance, and it is obtained from the test that a maximum distance for communication between the two mobile terminals is 30 mm. While the values of X and Y are increasing from 0, the deviation of the resonance frequency is decreasing, and the distance for communication is also decreasing. When the value of X increases until 23±3 mm, and the value of Y increases until 4±3 mm, the working mode of two mobile terminals is set into the P2P communication mode, and the two mobile terminals are placed back to back until being completely overlapped by a conventional operating manner, if the communication between the two mobile terminals is completed, success is recorded; if the communication between the two mobile terminals is uncompleted, failure is recorded. After 10 iterations of the above test, a statistic is obtained showing that the communication success rate is 80%. Then the two mobile terminals are pulled apart from each other to increase the relative distance, it is obtained from the test that the maximum distance for communication between the two mobile terminals is 25 mm. When the value of X is further increasing, the success rate is decreasing, and the distance for communication is also decreasing. Thus, an optimum designed point is that the value of X is 23±3 mm, the value of Y is 4±3 mm.

The recess 21 may be alternatively provided adjacent to other 3 corners of the coil 20.

Figure 5:
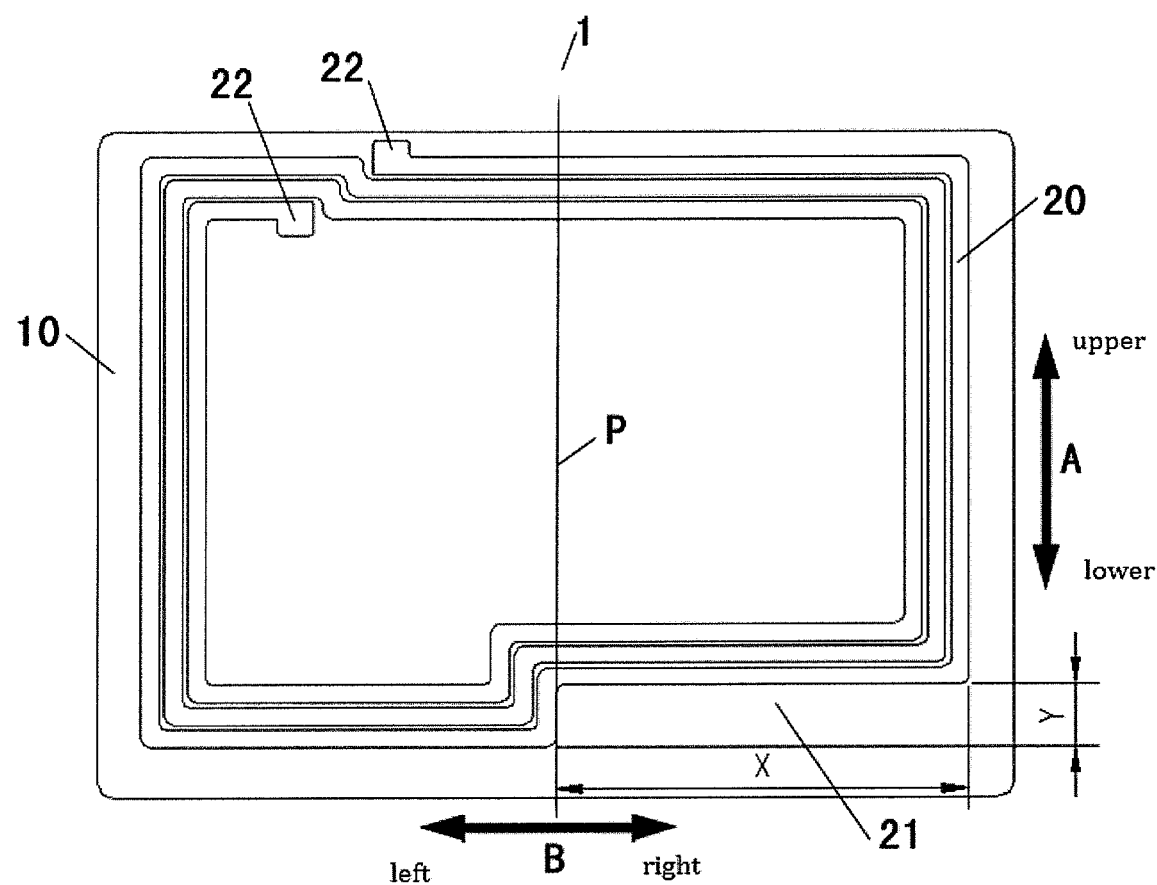
FIG. 5 is schematic view of a NFC antenna of a mobile terminal according to a second embodiment of the present disclosure.
Figure 6:
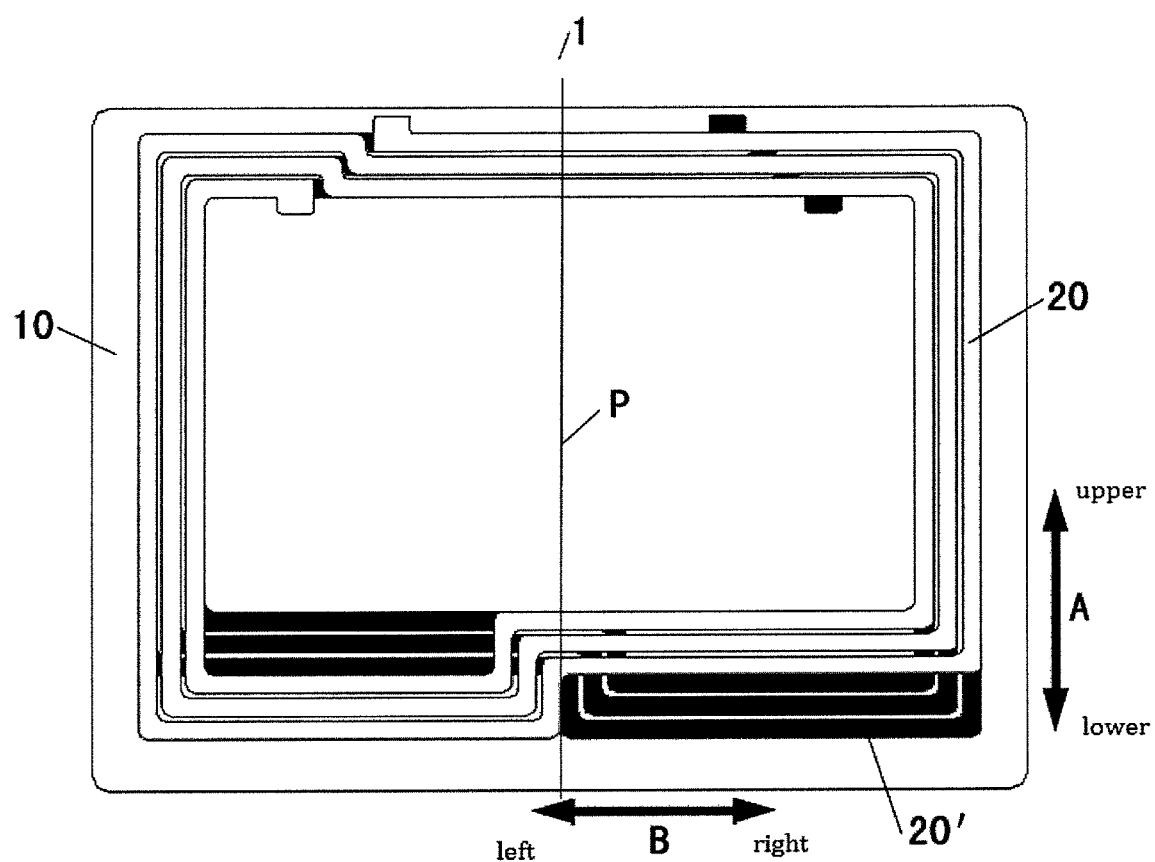
FIG. 6 is schematic view showing two NFC antennas as shown in FIG. 5 opposed to each other when operating P2P networking.

For an example, as shown in FIGS. 5 and 6, the recess 21 may be formed at a lower right portion of the coil 20 and adjacent to a lower right corner of the coil 20. The recess 21 is of a rectangular structure orientated in the left-right direction. The rectangular recess 21 has a long side parallel to a lower edge of the coil 20 and a short side parallel to the right edge of the coil 20. The width of the recess 21, referring to a distance represented by Y as shown in FIG. 5, is equal to the ring width of the coil 20. The length of the recess 21, referring to a distance represented by X as shown in FIG. 5, is equal to a half of a length of the coil 20 in the left-right direction.

In other words, as shown in FIG. 5, the lower edge of the coil 20 is provided with a bending portion bending upwards in a direction extending from left to right. The bending portion is adjoined to the rear longitudinal centerline P1 of the terminal body, and disposed before the rear longitudinal centerline P1 of the terminal body 100.

Figure 7:
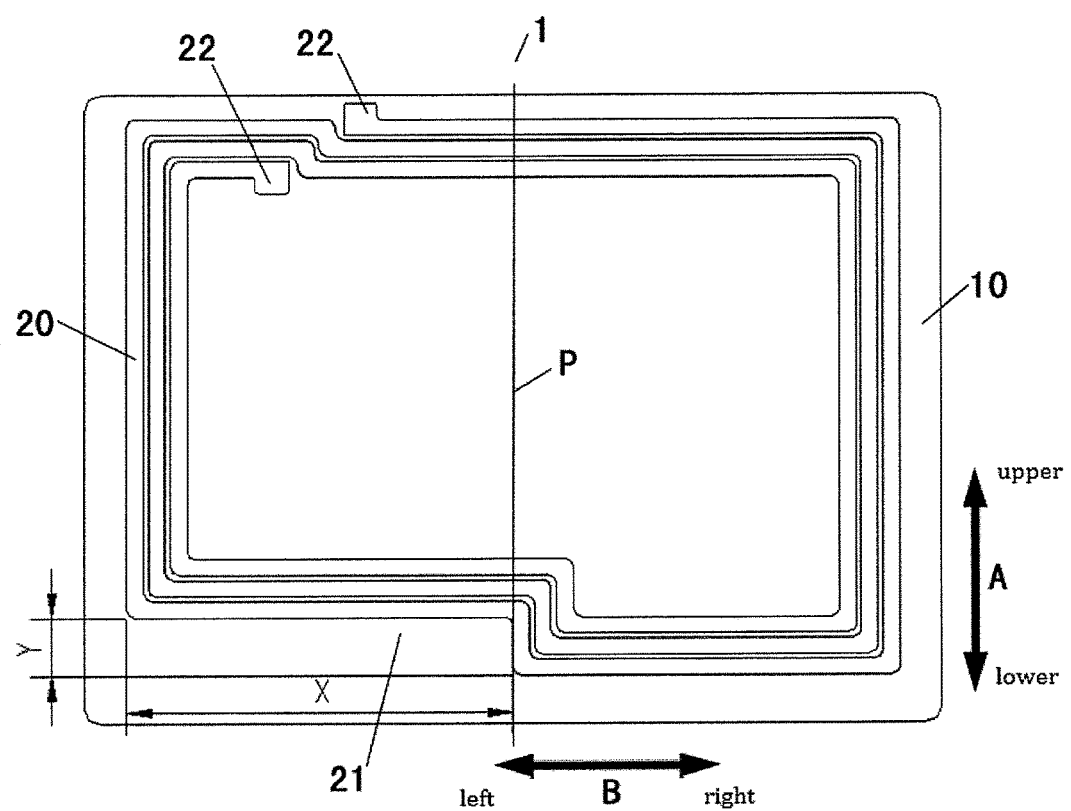
FIG. 7 is schematic view of a NFC antenna of a mobile terminal according to a third embodiment of the present disclosure.
Figure 8:
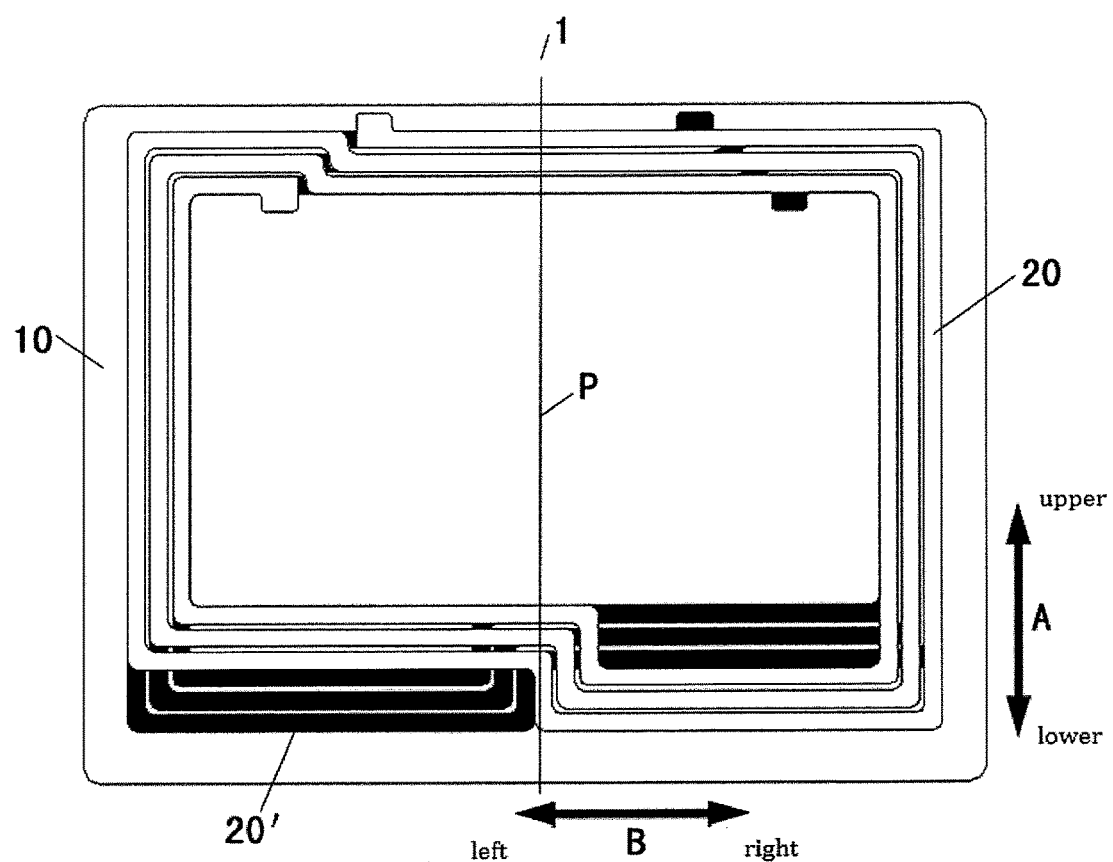
FIG. 8 is a schematic view showing two NFC antennas as shown in FIG. 7 opposed to each other when operating P2P networking.

In another embodiment of the present disclosure, as shown in FIGS. 7 and 8, the recess 21 may be formed at a lower left portion of the coil 20 and adjacent to a lower left corner of the coil 20. The recess 21 is of a rectangular structure orientated in the left-right direction. The rectangular recess 21 has a long side parallel to a lower edge of the coil 20 and a short side parallel to the left edge of the coil 20. The width of the recess 21, referring to a distance represented by Y as shown in FIG. 7, is equal to the ring width of the coil 20. The length of the recess 21, referring to a distance represented by X as shown in FIG. 7, is equal to a half of the length of the coil 20 in the left-right direction.

In other words, as shown in FIG. 7, the lower edge of the coil 20 is provided with a bending portion bending downwards in a direction extending from left to right. The bending portion is adjoined to the rear longitudinal centerline P1 of the terminal body, and disposed behind the rear longitudinal centerline P1 of the terminal body 100.

In some embodiments of the present disclosure, as shown in FIGS. 9 to 12, two recesses 21 are provided, and the two recesses 21 are disposed adjacent to two opposed corners of the coil 20 respectively.

Figure 9:
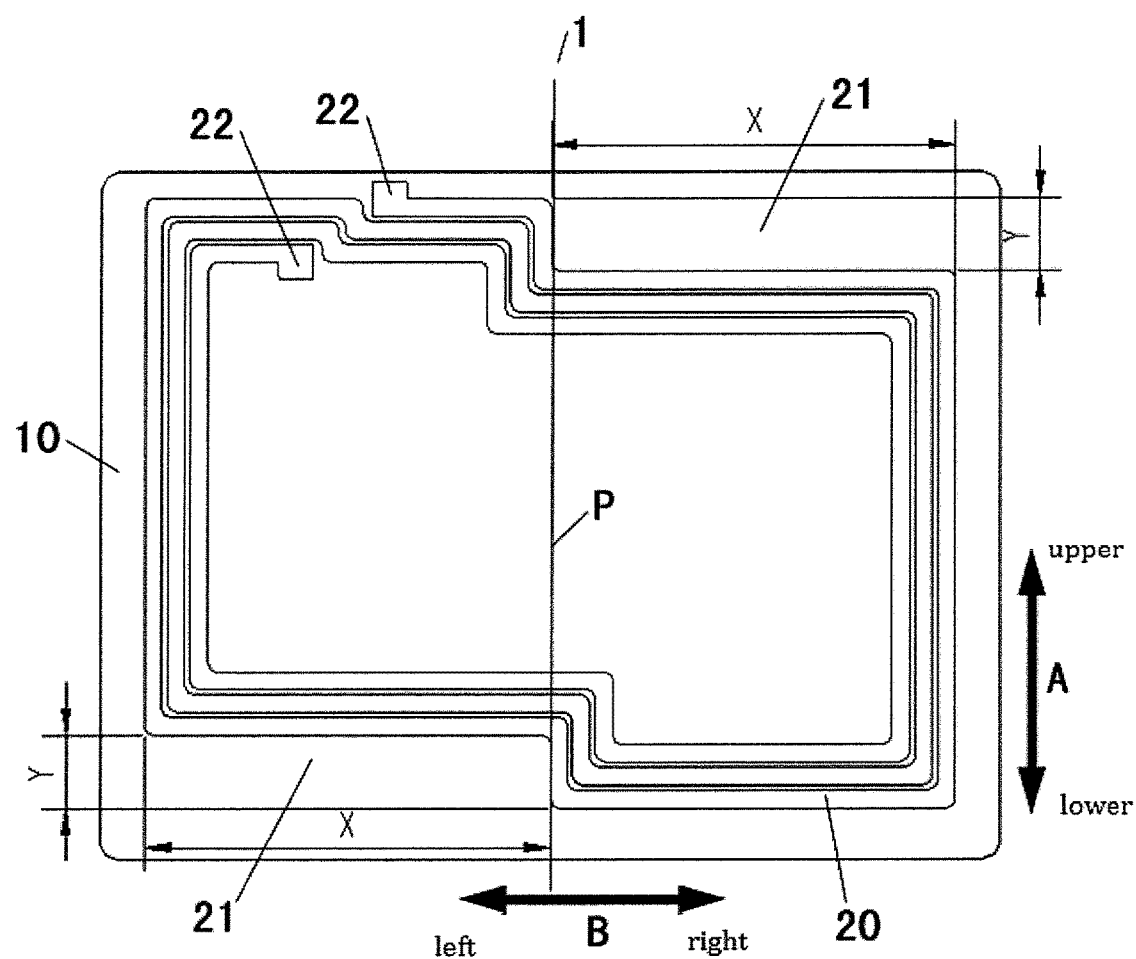
FIG. 9 is schematic view of a NFC antenna of a mobile terminal according to a fourth embodiment of the present disclosure.
Figure 10:
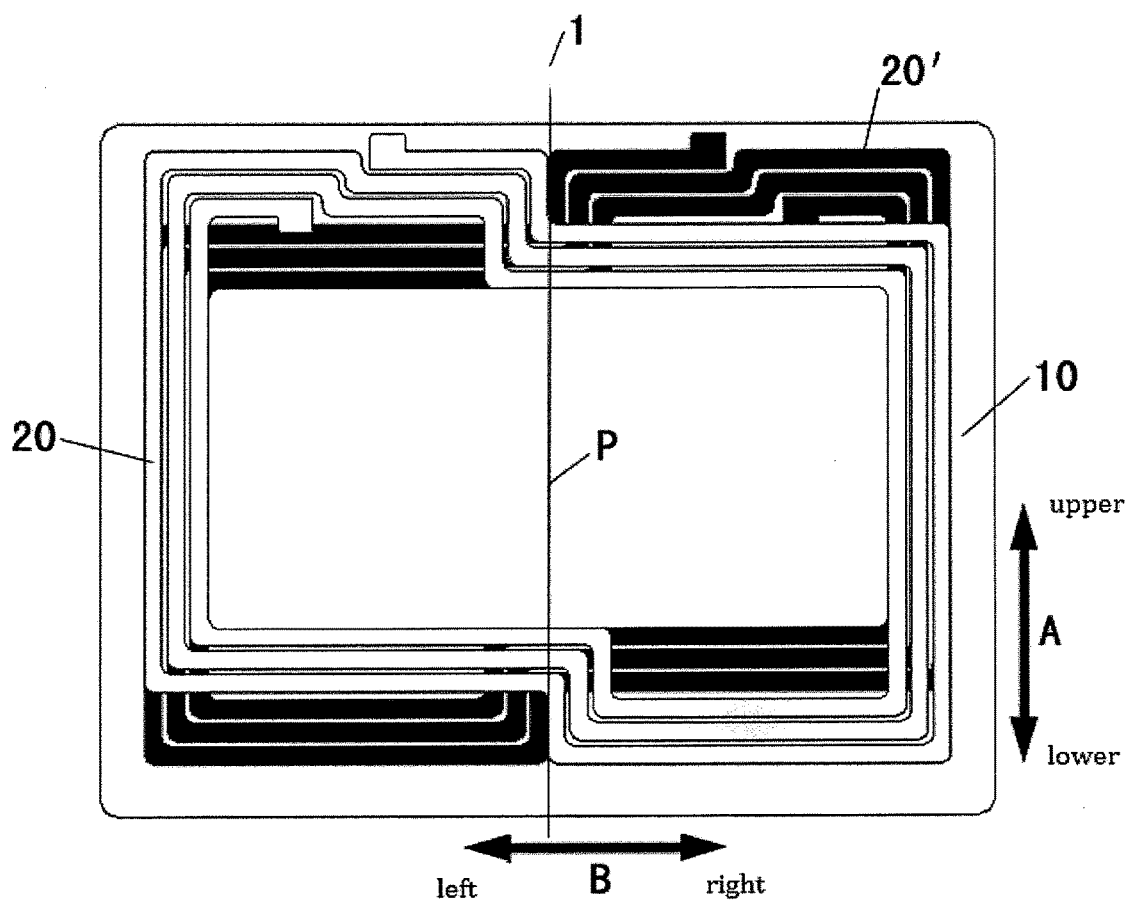
FIG. 10 is a schematic view showing two NFC antennas as shown in FIG. 9 opposed to each other when operating P2P networking.

Specifically, as shown in FIGS. 9 and 10, a first recess 21 is formed at an upper right portion of the coil 20 and adjacent to an upper right corner of the coil 20. The first recess 21 has a long side parallel to an upper edge of the coil 20 and a short side parallel to the right edge of the coil 20. A second recess 21 is formed at a lower left portion of the coil 20 and adjacent to a lower left corner of the coil 20. The second recess 21 has a long side parallel to a lower edge of the coil 20 and a short side parallel to the left edge of the coil 20. Both of the two recesses 21 have a same length, referring to a distance represented by X as shown in FIG. 9, equal to a half of the length of the coil 20 in the left-right direction. Both of the two recesses 21 have a same width, referring to a distance represented by Y as shown in FIG. 9, equal to the ring width of the coil 20.

In other words, as shown in FIG. 9, the upper edge of the coil 20 is provided with a first bending portion bending downwards in a direction extending from left to right. The first bending portion is adjoined to the rear longitudinal centerline P1 of the terminal body, and disposed before the rear longitudinal centerline P1 of the terminal body 100. The lower edge of the coil 20 is provided with a second bending portion bending downwards in a direction extending from left to right. The second bending portion is adjoined to the rear longitudinal centerline P1 of the terminal body, and disposed behind the rear longitudinal centerline P1 of the terminal body 100.

For example, as shown in FIG. 9, by an example that the NFC antenna 1 has a size of 50*40 mm, the ring width of coil 20 of the NFC antenna 1 is 4 mm. When the value of X is 0, the working mode of two mobile terminals is set into the P2P communication mode, and the two mobile terminals are placed back to back until being completely overlapped by a conventional operating manner, if the communication between the two mobile terminals is completed, success is recorded; if the communication between the two mobile terminals is not completed, failure is recorded. After 10 times of above test, a statistic is obtained showing that the communication success rate is 30%. Then the two mobile terminals are pulled apart from each other to increase the relative distance, it is obtained from the test that a maximum distance for communication between the two mobile terminals is 30 mm. While the values of X and Y are increasing from 0, the deviation of the resonance frequency is decreasing, and the distance for communication is also decreasing. When the value of X increases until 23±3 mm, and the value of Y increases until 4±3 mm, the working mode of two mobile terminals is set into P2P communication mode, and the two mobile terminals are placed back to back until being completely overlapped by a conventional operating manner, if the communication between the two mobile terminals is completed, success is recorded; if the communication between the two mobile terminals is not completed, failure is recorded. After 10 iterations of above test, a statistic is obtained showing that the communication success rate is 100%. Then the two mobile terminals are pulled apart from each other to increase the relative distance, it is obtained from the test that the maximum distance for communication between the two mobile terminals is 22 mm. When the value of X is further increasing, the success rate is decreasing, and the distance for communication is also decreasing. Thus, an optimum designed point is that the value of X is 23±3 mm, the value of Y is 4±3 mm.

Thus, not only the communication capacity of the NFC antenna 1 is ensured, but also the NFC antenna 1 has a larger asymmetrical area to decrease the deviation of the resonance frequency when operating P2P networking.

Figure 11:
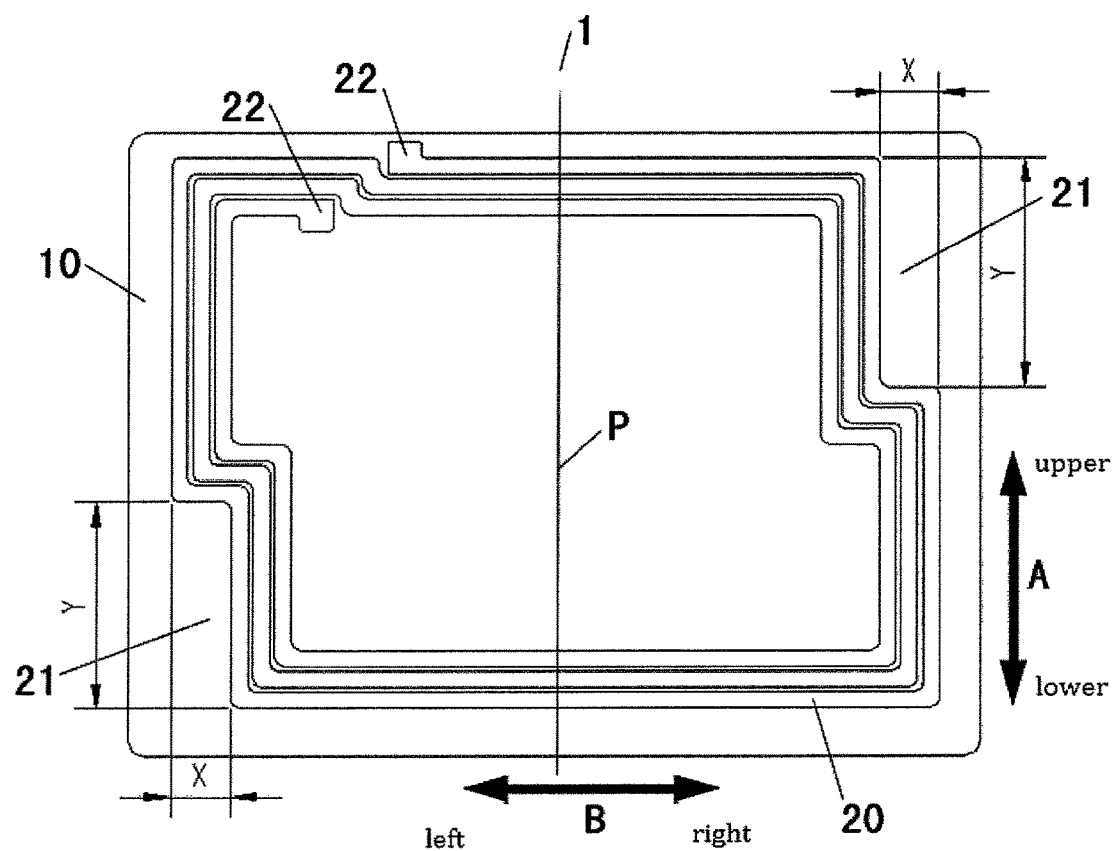
FIG. 11 is schematic view of a NFC antenna of a mobile terminal according to a fifth embodiment of the present disclosure.
Figure 12:
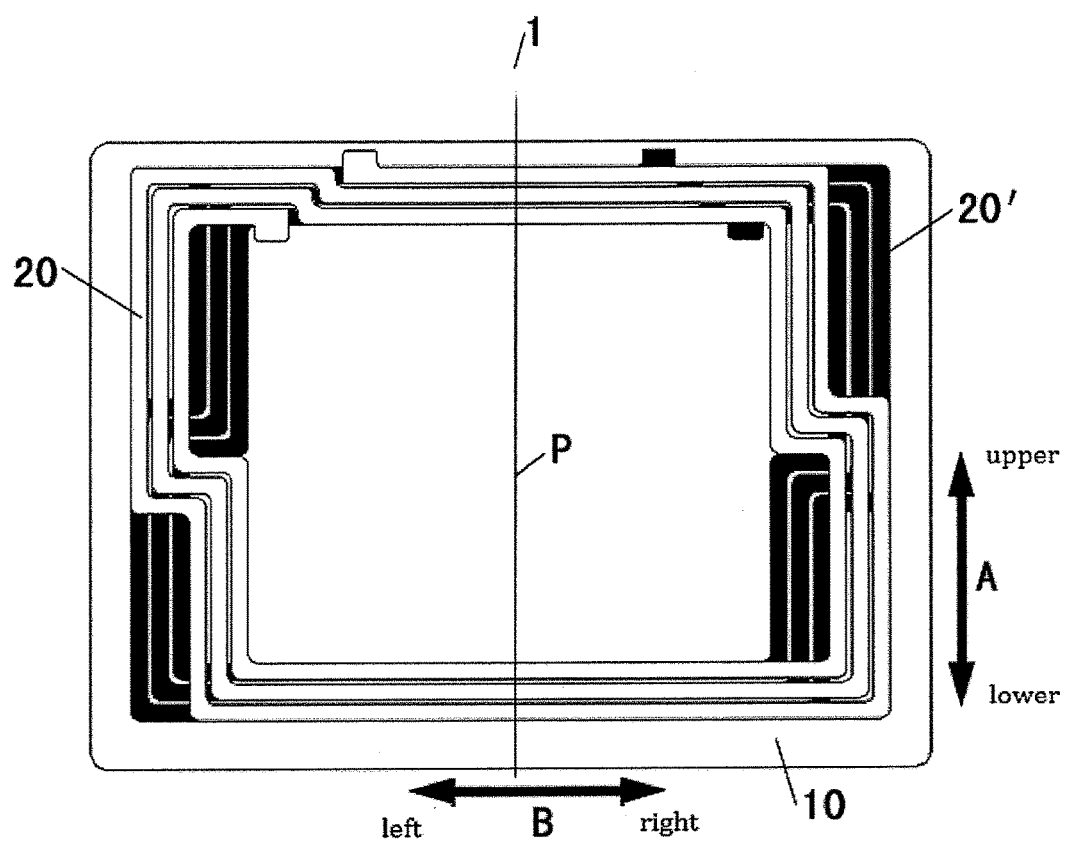
FIG. 12 is a schematic view showing two NFC antennas as shown in FIG. 11 opposed to each other when operating P2P networking.

As shown in FIGS. 11 and 12, the two rectangular recesses 21 may be oriented in the upper-lower direction. Specifically, a first rectangular recess may be formed at an upper right portion of the coil 20 and adjacent to an upper right corner of the coil 20. The first rectangular recess 21 has a long side parallel to a right edge of the coil 20 and a short side parallel to an upper edge of the coil 20. A second rectangular recess 21 may be formed at a lower left portion of the coil 20 and adjacent to a lower left corner of the coil 20. The second rectangular recess 21 has a long side parallel to a left edge of the coil 20 and a short side parallel to a lower edge of the coil 20. Both of the two rectangular recesses 21 have a same length, referring to a distance represented by Y as shown in FIG. 11, equal to a difference between a half of the length of the coil 20 in the left-right direction and the ring width of the coil 20. Both of the two rectangular recesses 21 have a same width, referring to a distance represented by X as shown in FIG. 11, equal to the ring width of the coil 20.

In other words, as shown in FIG. 11, the right edge of the coil 20 is provided with a first bending portion bending rightwards in a direction extending from upper to lower, the left edge of the coil 20 is provided with a second bending portion bending rightwards in a direction extending from upper to lower. A lower surface of the first bending portion is flush with an upper surface of the second bending portion.

It should be understood by those skilled in the related art that, a specific embodiment directed to the NFC antenna 1 being asymmetrically disposed with respect to the rear transverse centerline P2 of the terminal body 100, may refer to the above mentioned embodiments that the NFC antenna 1 is asymmetrically disposed with respect to the rear longitudinal centerline P1 of the terminal body 100. And a specific embodiment directed to the NFC antenna 1 being asymmetrically disposed with respect to both the rear longitudinal centerline P1 and the rear transverse centerline P2 of the terminal body 100, may be achieved by in combination of above two embodiments.

Other components and operations of the mobile terminal according to embodiments of the present disclosure are known to those skilled in the related art, and will not be elaborated herein.

The NFC antenna 1 according to embodiments of the present disclosure will be described herein with reference to FIGS. 1 to 12. As shown in FIGS. 1 to 12, the NFC antenna 1 according to embodiments of the present disclosure includes a coil 20 and a circuit substrate 10.

Further, as shown in FIG. 1, the circuit substrate 10 is defined with a substrate longitudinal centerline S1 and a substrate transverse centerline S2. The coil 20 is disposed on the circuit substrate 10, at least one of the substrate longitudinal centerline S1 and the substrate transverse centerline S2 pass through the coil 20, and the coil 20 is disposed asymmetrically to the at least one of the substrate longitudinal centerline S1 and the substrate transverse centerline S2.

In other words, the substrate longitudinal centerline S1 may pass through the coil 20, and the coil 20 may be asymmetrically disposed with respect to the substrate longitudinal centerline S1. The substrate transverse centerline S2 may also pass through the coil 20, and the coil 20 may be asymmetrically disposed with respect to the substrate transverse centerline S2. The substrate longitudinal centerline S1 and the substrate transverse centerline S2 may both pass through the coil 20, and the coil 20 may be asymmetrically disposed with respect to both the substrate longitudinal centerline S1 and the substrate transverse centerline S2.

In embodiments as shown in FIGS. 1 to 12, the substrate longitudinal centerline S1 may be overlapped with the rear longitudinal centerline P1 of the terminal body 100, or not overlapped with the rear longitudinal centerline P1 of the terminal body 100. Similarly, the substrate transverse centerline S2 may be overlapped with the rear transverse centerline P2 of the terminal body 100, or not overlapped with the rear transverse centerline P2 of the terminal body 100.

The NFC antenna 1 according to embodiments of the present disclosure, is provided by means of the coil 20 disposed asymmetrically to the at least one of the substrate longitudinal centerline S1 and the substrate transverse centerline S2, and the at least one of the substrate longitudinal centerline S1 and the substrate transverse centerline S2 passing through the coil 20. Thus when two NFC antennas 1 operate the P2P networking, one coil 20 of the two NFC antennas 1 may have the third part thereof opposed to the other coil, and a fourth part thereof staggered from the other coil. Therefore, the third part of the coil of the two NFC antennas 1 may ensure transmitting and receiving of signals, the fourth part of the coil of the two NFC antennas 1 may decrease the interference between the two NFC antennas 1 and the deviation of the resonance frequency, which may ensure the operating frequency of the NFC antenna 1 within the bandwidth range, and further ensure the communication sensitivity and success rate.

Thus, the NFC antenna 1 according to embodiments of the present disclosure shows a lower deviation of the resonance frequency when operating the P2P networking, and also shows high communication sensitivity, a high communication success rate, a strong communication capability, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A mobile terminal, comprising:
   a terminal body, comprising a rear surface defined by a rear longitudinal centerline and a rear transverse centerline; and
   a near field communication antenna, disposed on the rear surface of the terminal body, comprising a circuit substrate and a coil disposed on the circuit substrate, wherein the coil is defined by a coil longitudinal centerline and a coil transverse centerline,
   wherein at least one of the rear longitudinal centerline and the rear transverse centerline pass through the near field communication antenna, wherein the coil longitudinal centerline is deviated from the rear longitudinal centerline and/or the coil transverse centerline is deviated from the rear transverse centerline.

2. The mobile terminal according to claim 1, wherein the coil is of a quadrilateral ring structure, and the coil longitudinal centerline is deviated from the rear longitudinal centerline.

3. The mobile terminal according to claim 2, wherein a ratio of a distance between the coil longitudinal centerline and the rear longitudinal centerline to a ring width of the coil is ½.

4. The mobile terminal according to claim 1, wherein the coil is of a quadrilateral ring structure, and the coil transverse centerline is deviated from the rear transverse centerline.

5. The mobile terminal according to claim 4, wherein a ratio of a distance between the coil transverse centerline and the rear transverse centerline to a ring width of the coil is ½.

6. The mobile terminal according to claim 1, wherein the coil is of a quadrilateral ring structure, a triangular ring structure or a circular structure.

7. The mobile terminal according to claim 1, wherein the coil is of a quadrilateral ring structure and has a recess adjacent to a corner thereof.

8. The mobile terminal according to claim 7, wherein the recess is of a rectangular structure, and a width of the recess is equal to a ring width of the coil.

9. The mobile terminal according to claim 7, wherein the recess evades an ending of a wire which is wound into the coil.

10. The mobile terminal according to claim 7, wherein two recesses are provided, and the two recesses are disposed adjacent to two opposed corners of the coil respectively.

11. The mobile terminal according to claim 1, wherein the circuit substrate is defined with a substrate longitudinal centerline superposed to the rear longitudinal centerline.

12. The mobile terminal according to claim 1, wherein the circuit substrate is defined with a substrate transverse centerline superposed to the rear transverse centerline.

13. A method for setting a peer-to-peer (P2P) network, comprising:

disposing a first coil on a first circuit substrate of a first near field communication antenna, wherein the first near field communication antenna is disposed on a first rear surface of a first terminal body, wherein the first rear surface is defined by a first rear longitudinal centerline and a first rear transverse centerline, wherein the first coil is defined by a first coil longitudinal centerline and a first coil transverse centerline, wherein the first coil longitudinal centerline is deviated from the first rear longitudinal centerline and/or the first coil transverse centerline is deviated from the first rear transverse centerline;

disposing a second coil on a second circuit substrate of a second near field communication antenna, wherein the second near field communication antenna is disposed on a second rear surface of a second terminal body, wherein the second rear surface is defined by a second rear longitudinal centerline and a second rear transverse centerline, wherein the second coil is defined by a second coil longitudinal centerline and a second coil transverse centerline, wherein the second coil longitudinal centerline is deviated from the second rear longitudinal centerline and/or the second coil transverse centerline is deviated from the second rear transverse centerline;

placing the first rear surface of the first terminal body against the second rear surface of the second terminal body, wherein the first rear longitudinal centerline is superposed to the second rear longitudinal centerline and the first rear transverse centerline is superposed to the second rear transverse centerline, wherein the first coil longitudinal centerline is deviated from the second coil longitudinal centerline and/or the first coil transverse centerline is deviated from the second coil transverse centerline; and setting the first terminal body and the second terminal body to P2P communication mode.

* * * * *